Patented Dec. 23, 1952

2,622,997

UNITED STATES PATENT OFFICE 2,622,997

PROCESS OF PRODUCING INSOLUBLE COATING FROM SALTS OF CARBOXYLIC ACIDS

Jan Lolkema and Pieter Johannes Adrianus Beersma, Hoogezand, Netherlands, assignors to Naamlooze Vennootschap: W. A. Scholten's Chemische Fabrieken, Groningen, the Netherlands, a corporation of the Netherlands No Drawing. Application May 28, 1948, Serial No. 29,944. In the Netherlands May 30, 1947

3 Claims. (Cl. 117—165)

A process is known for producing insoluble layers on carriers, according to which the carrier is first treated with a solution of a salt of a starch ether carboxylic acid and/or of a starch ester carboxylic acid, said salt having the property of swelling or dissolving in water, and subsequently, either or not after an intermediate drying process, with a solution of a salt of a polyvalent metal forming an insoluble salt with said carboxylic acid.

Salts of tri- or polyvalent metals are preferably used for this purpose.

In the above mentioned process the carrier is to be treated successively with two baths. According to the invention, however, it is possible to obtain a layer consisting of the insoluble ferric compounds by treating the carrier with a solution containing both a water soluble salt of the starch ether carboxylic acid and/or of the starch ester carboxylic acid having the property of swelling or dissolving in water and a soluble ferrous salt, and subsequently forming the insoluble ferric compound of the starch ether and/or ester carboxylic acid on the carrier by oxidation.

It has been found that the ferrous salts of the starch ether or ester carboxylic acids are soluble, so that it is possible to apply the salt of the carboxylic acid and the ferrous salt to the carrier in the form of a single bath. The soluble ferrous compounds of the carboxylic acid may then be converted on the carrier into the insoluble ferric compound. This oxidation will occur spontaneously by the oxygen contained in the air, but it may be accelerated, if desired, by the addition of oxidizing agents, such as e. g. hydrogen peroxide, benzoyl peroxide or perbenzoic acid.

It is also possible to promote the oxidation by heating, or by exposure to ultra-violet or infra-red rays, by the addition of the known lacquer siccatives, such as cobalt or manganese-naphthenate or linoleate and the like.

In some cases it may also be useful to retard the oxidation, e. g. by the addition of antioxidants, such as sodium hydrosulphite.

Ferrous salts suitable for this purpose are e. g. ferro sulphate and ferro ammonium sulphate, the action of which is a little slower than that of ferro sulphate.

The present process is of particular importance with regard to starch ether carboxylic acids and/or starch ester carboxylic acids, i. e. ethers, esters or mixed ether-esters of starch containing in their ether and/or ester group(s) one or more free carboxyl groups. The ether carboxylic acid may be obtained by etherification of starch with hydroxy-carboxylic acids, the ester carboxylic acids by partial esterification of starch with polybasic carboxylic acids. The etherifying or esterifying treatment may be carried out according to known methods. A suitable method for the preparation of the starch ether carboxylic acids consists e. g. in etherifying starch in an alkaline medium with halogen carboxylic acids.

It is also possible, however, to carry out the etherifying treatment with other etherifying agents, such as e. g. salts of glycidic acid or methyl glycidic acid. The ethers may or may not be freed of salts formed during the reaction, e. g. by precipitation with alcohol. A very simple and economical method of preparing the starch ether carboxylic acid is described in U. S. Patent No. 2,459,108, and the products obtained according to the said method are especially suitable for carrying out the present process.

It is also possible to use ether carboxylic acids containing other ether groups, besides the carboxy-alkoxy group, which may e. g. be obtained by etherifying starch both with a halogen carboxylic acid and an epoxy-alkane either simultaneously or successively and in any desired sequence. The starch may be treated before, during or after the etherification process, with aldehydes, preferably formaldehyde, e. g. in the manner described in U. S. patent application Serial No. 707,321, now U. S. Patent 2,575,423.

The ester carboxylic acids may be obtained e. g. by partially esterifying starch with anhydrides of dibasic carboxylic acids, such as phthalic acid, succinic acid or maleic acid anhydride.

It is also possible to employ compounds containing both ether and ester groups.

The term starch in the present application not only includes the various native starches and starch derivatives, such as soluble starch, dextrin, cold swelling starch and the like, but also starch containing products such as natural or synthetic mixtures of starches or starch derivatives with proteins or with proteins and cellulose such as wheat, rye, buckwheat and the like.

The invention, however, is not only important for the formation of insoluble layers from starch ether and/or ester carboxylic acids, but we may also use other compounds of high molecular weight containing one or more carboxyl groups, the ferrous salts of which are soluble, whereas the ferric salts are insoluble, such as for instance, cellulose ether carboxylic acids and cellulose ester carboxylic acids and alginic acids.

In this case too the organic compound of high molecular weight and the ferrous salt may be used together in one and the same bath, without any precipitate being formed while an insoluble ferric acid salt will be produced on the carrier treated with the solution.

The layers obtained according to the invention are slightly colored, so that the method in question cannot be used in cases where a perfectly colourless layer is desired. In many cases, however, the colour of the layer will not cause any inconvenience, particularly in those cases in which still other layers or another material are superimposed on the layer in question.

In actual practice the invention has the great advantage that it may be carried out in an extremely simple manner, since the carrier to be coated is only treated with one bath in order to obtain the desired results.

We may use combinations of the substances employed according to the invention with other salts, soluble or swelling in water, of natural or synthetic products containing free carboxyl groups, whereby special effects are obtained, such as a better resistance to water, or an improved suppleness of the film and the like. Examples of such products are cellulose ether or cellulose ester carboxylic acids, alginic acid, abietic acid, fatty acids of high molecular weight, polymethacrylic acid, shellac and the like.

In so far as they are acids, they may be added to the solution of the starch ether or ester carboxylic acid, in the form of a water soluble salt, so that in combination with the solution of the polyvalent metal salt they will form an insoluble compound on the carrier. If desired, we may also add other binding agents, such as e. g. casein.

For certain purposes, the resistance to water and the stability of the layers formed may be increased by adding a small quantity of a synthetic resin of the polycondensation type e. g. a urea, melamine or phenol resin. The said resins may be applied either or not in the form of a pre-condensate.

The formation of insoluble layers on carriers according to the invention, may be utilized for various purposes e. g. for finishing and sizing textile materials for thickening and fixing purposes in the art of printing on paper or on textile materials, for internally or externally sizing paper, for binding all kinds of pulverulent, granular or fibrous materials (priming agents, water colours, briquettes, cork substitutes, fibre and artificial wood plates etc.) in the industry of adhesives and the like. A valuable application of the invention is the manufacture of a weather- and waterproof pasteboard for packing purposes, and of washable printed wall paper.

The invention will be illustrated by the following examples.

Example 1

20 parts by weight of a commercial cellulose glycolate of medium viscosity were dissolved in 400 parts by volume of cold water. To this solution there were added 25 parts by volume of a solution of commercial ferrous sulphate of 30% by weight, whereby owing to a small amount of ferric salt present in the ferrous sulphate a gelatinous brownish mass was produced which was unsuitable for being applied to a carrier by the usual devices. If, however, a small quantity of sodium hydrosulphite is dissolved in the gelatinous, thickened mass, the ferric compound will be reduced and the mass will very soon be transformed into a colourless, smooth and fluid paste, which will very readily form a coating. Pasteboard was coated on one side with the said paste by means of rollers whereupon the layer thus obtained was dried in the air.

The paste will remain fit for use for a considerable time. If the said paste is left to itself e. g. during the night a reddish brown film will be formed on the thickened mass by oxidation. This film will protect the liquid present below the same from further oxidation. After the said film has been removed, the paste will be ready for use once more.

The quantity of sodium hydrosulphite to be added depends on the quantity and the quality of the ferrous sulphate and also on the other reaction conditions, such as the nature and the concentration of the compound containing carboxyl groups, the temperature and the like. This quantity may be readily predetermined for each case by a few experiments; it generally only amounts to a few percents of the amount of ferro sulphate. If the paste after a few hours cannot be readily applied any longer, because it is gelatinized by oxidation, its original coating properties may be easily restored by the addition of a small quantity of fresh hydrosulphite, without unfavourably affecting the ultimate result. Sodium hydrosulphite therefore is a valuable agent for imparting to the ferrous sulphate containing solutions the stability required for the application of the said solutions in actual practice. On the other hand the hydrosulphite is rendered inactive very soon by oxidation in the air, so that it will not hamper the formation of the insoluble layer on the carrier.

Example 2

2000 parts by weight of potato starch, 2500 parts by volume of water and 1100 parts by weight of a 30% caustic soda solution were intimately mixed. To the alkaline starch paste there was subsequently added a solution of the sodium salt of monochloroacetic acid obtained by carefully neutralizing a solution of 750 parts by weight of commercial monochloroacetic acid in 350 parts by volume of water by means of a 30% caustic soda solution. The reaction mass was then heated while stirring to a temperature of between 70 and 80° C. during 2 hours after which it was dried as described in U. S. Patent Application Serial No. 380,562, now U. S. Patent 2,459,108.

50 parts by weight of the starch ether carboxylic acid in the form of the sodium salt thus prepared were dissolved in 250 parts by volume of cold water and the solution was diluted with 200 cm.³ of water. There were subsequently added 50 parts by volume of a 40% by weight ferrous sulphate solution, in which 1 part by weight of sodium hydrosulphite had been previously dissolved. The paste thus prepared, which without the addition of fresh hydrosulphite would be workable for only a few hours, is very suitabl for the formation of layers or films resistant to water and moulds on carriers of various natures.

It is also possible to obtain pastes with excellent keeping properties by first rendering the starch ether carboxylic acid salt solution slightly acid, e. g. with phosphoric acid, and subsequently adding a ferrous sulphate solution.

In that case the oxidation on the carrier will proceed a little more slowly than when a small quantity of sodium hydrosulphite is used for stabilizing the paste.

*Example 3*

A solution of 4 parts by weight of ferrous sulphate in 10 parts by volume of water was added to a cold, slightly alkaline solution of 10 parts by weight of sodium alginate in 300 parts by volume of water. A smooth brownish green thickened mass was obtained which could readily be applied with a brush, and remained workable for several hours. A length of paper was coated with the said solution and subsequently dried at an elevated temperature. The coating after having been exposed to the air for a short time, proved to be perfectly resistant to water. If desired, a layer of this nature may be treated after drying with a very dilute solution of hydrogen peroxide, whereby a perfectly water resistant layer will be immediately obtained.

*Example 4*

2500 parts by weight of potato starch, 2500 parts by volume of water and 675 parts by weight of a 30% caustic soda solution are intimately mixed. A solution of the sodium salt of monochloroacetic acid obtained by carefully neutralizing a solution of 475 parts by weight of commercial monochloroacetic acid in 200 parts by volume of water with a 30% caustic soda solution was added.

The reaction mass was then heated while stirring at a temperature of between 60 and 70° C. for one hour, after which the entire mixture was brought into a dry form in the manner described in U. S. patent application Serial No. 380,562. 100 parts by weight of the starch ether carboxylic acid in the form of the sodium salt thus prepared were dissolved in 700 parts by volume of water, after which the solution was rendered slightly acid by the addition of 2 parts by volume of a 68% solution of phosphoric acid. To this mixture there were successively added a solution of 25 parts by weight of $Fe.SO_4.7H_2O$ in 100 parts by volume of water, and a solution of 1 part by weight of Marseille soap in 100 parts by volume of water. A smooth paste suitable for being applied with a brush was obtained, the pH value of the said paste amounting to approximately 5. Wall paper was coated with the paste on its printed side and subsequently dried. After the paper thus treated has been exposed to the air for some days, it appeared that the colouring matter had been fixed in such a way that it was absolutely proof against water, so that the wall paper could be wiped with a wet cloth without any spots appearing.

Water colours applied to walls and the like may also be rendered completely waterproof by a treatment with the above mentioned solution.

We claim:

1. A process of producing insoluble coatings, comprising adding both a water soluble ferrous salt and sodium hydrosulphite in an amount to inhibit the oxidation of the ferrous salt during coating to an aqueous solution of a water soluble salt of a carboxylic acid selected from the group consisting of starch ether carboxylic acids, starch ester carboxylic acids, cellulose ether carboxylic acids, cellulose ester carboxylic acids and alginic acid to form a water soluble coating mixture containing the ferrous salt, applying the solution thus obtained to the surface to be coated and subsequently drying said coated surface in contact with the air so as to form the insoluble ferric compound of said salt of carboxylic acid.

2. A process according to claim 1 in which the coated and subsequently dried surface is treated with an oxidizing agent selected from the group consisting of hydrogen peroxide, benzoyl peroxide and perbenzoic acid.

3. A process according to claim 1 in which the sodium hydrosulphite is added to the solution of the ferrous salt, prior to mixing the same with the solution of the salt of the carboxylic acid.

JAN LOLKEMA.
PIETER JOHANNES
    ANDRIANUS BEERSMA.

REFERENCES CITED

The following references are of record in the file of this patent:

UNITED STATES PATENTS

| Number | Name | Date |
|---|---|---|
| 2,087,237 | Bolton | July 20, 1937 |
| 2,171,222 | Meyer | Aug. 29, 1939 |
| 2,308,692 | Freeman et al. | Jan. 19, 1943 |

OTHER REFERENCES

Sodium Carboxymethylcellulose, National Paint, Varnish and Lacquer Ass'n, Inc., Circular 688, August 1944, pages 191–194.